(12) United States Patent
Ishimitsu et al.

(10) Patent No.: US 6,381,572 B1
(45) Date of Patent: Apr. 30, 2002

(54) METHOD OF MODIFYING FEATURE PARAMETER FOR SPEECH RECOGNITION, METHOD OF SPEECH RECOGNITION AND SPEECH RECOGNITION APPARATUS

(75) Inventors: Shunsuke Ishimitsu; Ikuo Fujita, both of Kawagoe (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/288,973

(22) Filed: Apr. 9, 1999

(30) Foreign Application Priority Data

Apr. 10, 1998 (JP) .......................................... 10-099051

(51) Int. Cl.[7] .............................................. G10L 17/00
(52) U.S. Cl. ...................................... 704/246; 704/250
(58) Field of Search .................................. 704/246, 250

(56) References Cited

U.S. PATENT DOCUMENTS

| | | | | |
|---|---|---|---|---|
| 5,293,588 A | * | 3/1994 | Satoh et al. ................. | 704/233 |
| 5,717,820 A | * | 2/1998 | Hamasaki et al. ........... | 704/231 |
| 5,793,891 A | * | 8/1998 | Takahashi et al. .......... | 382/228 |
| 5,794,194 A | * | 8/1998 | Takebayashi et al. ....... | 704/251 |
| 5,864,809 A | * | 1/1999 | Suzuki ........................ | 704/254 |
| 5,960,395 A | * | 9/1999 | Tzirkel-Hancock ......... | 704/241 |
| 6,006,175 A | * | 12/1999 | Holzrichter et al. ........ | 704/208 |
| 6,263,308 B1 | * | 7/2001 | Heckerman et al. ........ | 704/231 |

OTHER PUBLICATIONS

Han et al, Discriminative Learning of Additive Noise and Channel Distortion for Robust Speech Recognition, pp 81–84, IEEE 1998.*

Vaseghi et al, "Noise Compensation Methods for Hidden Markov Model Speech Recognition in Adverse Environments", 1997 IEEE, pp11–21.*

Hwang et al, "Feature Adaptation Using Deviation Vector for Robust Speech Recognition in Noisy Environments", 1997 IEEE, pp 1227–1230.*

Openshaw, "Reducing the Environmental Sensitivity of Cepstral Features for Speaker Recognition", pp721–724, ICSP 1996.*

Vaseghi, "Speech Modelling using Cepstral–Time Feature Matrices in Hidden Markov Models", IEE Proceedings, 1993, pp317–320.*

* cited by examiner

*Primary Examiner*—Fan Tsang
*Assistant Examiner*—Michael N. Opsasnick
(74) *Attorney, Agent, or Firm*—Finnegan, Henderson, Farabow, Garrett & Dunner, L.L.P.

(57) ABSTRACT

A method of modifying feature parameters for a speech recognition is provided. This method is provided with: a process of extracting the feature parameter from an input speech in a real environment; a process of reading a first speech transfer characteristic corresponding to an environment in which a reference pattern for the speech recognition is generated, from a first memory device; a process of reading a second speech transfer characteristic corresponding to the real environment from a second memory device; a process of modifying the extracted feature parameter according to the first speech transfer characteristic and the second speech transfer characteristic to convert the extracted feature parameter corresponding to the real environment into a modified feature parameter corresponding to the environment in which the reference pattern is generated.

12 Claims, 1 Drawing Sheet

METHOD OF MODIFYING FEATURE PARAMETER FOR SPEECH RECOGNITION, METHOD OF SPEECH RECOGNITION AND SPEECH RECOGNITION APPARATUS

BACKGROUND OF THE INVENTION

1. Field of the Invention

The present invention relates to a speech recognition apparatus and method. More specifically, the present invention relates to a method of modifying feature parameters of an input speech for a speech recognition.

2. Description of the Related Art

Speech recognition apparatuses which recognize an input speech are well known. A typical speech recognition apparatus are usually mounted in a car, or installed in a telephone. Therefore, it works in such various environments. So the speech recognition apparatuses are needed to work with a good performance in such various environments.

In such various environments, a speech produced by a speaker is distorted while it is transferred to an input device of the speech recognition apparatus, because of a variety of sound fields characteristics or fluctuation of telephone line characteristics On the other hand, a transfer function corresponding to registered patterns in a dictionary for the speech recognition is effective in an ideal environment in which the dictionary is made. But, it is not so effective in a real environment. Therefore, the accuracy of the speech recognition is degrading because of a mismatch between the transfer function in a real environment and the transfer function in an ideal environment.

SUMMARY OF THE INVENTION

It is therefore an object of the present invention to provide a speech recognition method and apparatus, which can recognize a speech in a real environment without great degradation of an accuracy of the speech recognition.

The above object can be achieved by a first method of modifying feature parameter for the speech recognition according to one aspect of the present invention. This invention is provided with: a process of extracting the feature parameter from an input speech in a real environment; a process of reading a first speech transfer characteristic corresponding to an environment in which a reference pattern for the speech recognition is generated, from a first memory device; a process of reading a second speech transfer characteristic corresponding to the real environment from a second memory device; and a process of modifying the extracted feature parameter according to the first speech transfer characteristic and the second speech transfer characteristic to convert the extracted feature parameter corresponding to the real environment into a modified feature parameter corresponding to the environment in which the reference pattern is generated.

According to the method of modifying feature parameter for the speech recognition of the present invention, a speech spoken by a speaker is inputted into a speech recognition apparatus, and a feature parameter is extracted. This extracted feature parameter, which includes distortion resulted from a speech transfer characteristic, are modified according to a first speech transfer characteristic, which corresponds to an environment in which the reference pattern for the speech recognition is generated, and a second speech transfer characteristic, which corresponds to a real environment. Then, a modified feature parameter, which corresponds to the environment in which the reference pattern is made, is generated. Therefore, distortion of the feature parameter caused by a real environment can be removed, and modified feature parameter, which can contribute to an improvement of an accuracy of the speech recognition, are derived.

According to another aspect of the present invention, in the above-stated first method, the feature parameter may be expressed in a frequency domain, the first speech transfer characteristic and the second speech transfer characteristic may be a first transfer function and a second transfer function in the frequency domain respectively, and the modifying process may modify the extracted feature parameter according to a formula: $F \cdot C1/C2$ where the F is the extracted feature parameter, the C1 is the first transfer function, and the C2 is the second transfer function.

In this aspect, the feature parameters as a target of the modifying process are expressed in a frequency domain, and the first speech transfer characteristic and the second speech transfer characteristic are expressed as transfer functions in the frequency domain respectively. The modification of the extracted feature parameter is performed with a multiplication and a division using these two transfer functions. Therefore, an influence of the real environment can be removed, and a processing time can be reduced compared with using the feature parameter expressed in a time domain.

According to further aspect of the present invention, in the above-stated first method, the feature parameter may be expressed in a cepstrum domain, the first speech transfer characteristic and the second speech transfer characteristic may be a first transfer function and a second transfer function in the cepstrum domain respectively, and the modifying process may modify the extracted feature parameter according to a formula: $F+C1-C2$, where the F is the extracted feature parameter, the C1 is the first transfer function, and the C2 is the second transfer function.

In this aspect, the feature parameter as a target of the modifying process is expressed in a cepstrum domain, and the first speech transfer characteristic and the second speech transfer characteristic are expressed as transfer functions in the cepstrum domain respectively. The modification of the extracted feature parameter is performed with an addition and a subtraction using these two transfer functions. Therefore, an influence of the real environment can be removed, and a processing time can be reduced compared with using the feature parameter expressed in a time domain or a frequency domain.

The above object can be also achieved by a second method of speech recognition according to further aspect of the present invention. This invention is provided with: a process of extracting a feature parameter from an input speech in a real environment; a process of reading a first speech transfer characteristic corresponding to an environment in which a reference pattern for the speech recognition is generated, from a first memory device; a process of reading a second speech transfer characteristic corresponding to the real environment from a second memory device; a process of modifying the extracted feature parameter according to the first speech transfer characteristic and the second speech transfer characteristic to convert the extracted feature parameter corresponding to the real environment into a modified feature parameter corresponding to the environment in which the reference pattern is generated ; and a process of calculating an output probability using the modified feature parameter and the reference pattern; a process of recognizing the input speech using the calculated output probability.

According to this method of speech recognition of the present invention, a speech spoken by a speaker is inputted into a speech recognition apparatus, and, feature parameter is extracted. This extracted feature parameter, which includes distortion resulted from a speech transfer characteristic, is modified according to a first speech transfer characteristic, which corresponds to an environment in which the reference pattern is generated, and a second speech transfer characteristic, which corresponds to the real environment. Then, a modified feature parameter, which correspond to the environment in which the reference pattern is made, is generated. And the input speech is recognized on the basis of the calculation using the modified feature parameter and the reference pattern. Therefore, distortion of the extracted feature parameter caused by the real environment can be removed, and an accuracy of the speech recognition can be improved.

According to further aspect of the present invention, in the above-stated second method, the feature parameter may be expressed in a frequency domain, the first speech transfer characteristic and the second speech transfer characteristic may be a first transfer function and a second transfer function in the frequency domain respectively, and the modifying process may modify the extracted feature parameter according to a formula: $F \cdot C1/C2$ where the F is the extracted feature parameter, the C1 is the first transfer function, and the C2 is the second transfer function.

In this aspect, the feature parameter as a target of the modifying process is expressed in a frequency domain, and the first speech transfer characteristic and the second speech transfer characteristic are expressed as transfer functions in the frequency domain respectively. The modification of the extracted feature parameter is performed with a multiplication and a division using these two transfer functions. And the output probability is calculated, and then, the input speech is recognized. Therefore, distortion caused by an influence of the real environment can be removed, and an accuracy of the speech recognition can be improved with simple and rapid processes.

According to further aspect of the present invention, in the above-stated second method, the feature parameter may be expressed in a cepstrum domain, the first speech transfer characteristic and the second speech transfer characteristic may be a first transfer function and a second transfer function in the cepstrum domain respectively, and the modifying process may modify the extracted feature parameter according to a formula: $F+C1-C2$, where the F is the extracted feature parameter, the C1 is the first transfer function, and the C2 is the second transfer function.

In this aspect, the feature parameter as a target of the modifying process is expressed in a cepstrum domain, and the first speech transfer characteristic and the second speech transfer characteristic are expressed as transfer functions in the cepstrum domain respectively. The modification of the extracted feature parameter is performed with an addition and a subtraction using these two transfer functions. And the output probability is calculated, and then, the input speech is recognized. Therefore, distortion of an influence of the real environment can be removed, and an accuracy of the speech recognition can be further improved with simple and rapid processes.

The above object can be also achieved by a speech recognition apparatus according to the present invention. This invention is provided with: an extracting device for extracting a feature parameter from an input speech in a real environment; a first memory device for storing a first speech transfer characteristic corresponding to an environment in which a reference pattern for the speech recognition is generated; a second memory device for storing a second speech transfer characteristic corresponding to the real environment; a modifying device for modifying the extracted feature parameter according to the first speech transfer characteristic and the second speech transfer characteristic to convert the extracted feature parameter corresponding to the real environment into a modified feature parameter corresponding to the environment in which the reference pattern is generated; a calculating device for calculating an output probability using the modified feature parameter and the reference pattern; and a recognizing device for recognizing the input speech using the calculated output probability.

By this apparatus, distortion of the feature parameter caused by the real environment can be removed, and an accuracy of the speech recognition apparatus can be improved in various environments.

According to further aspect of the present invention, in the above-stated apparatus, the feature parameter may be expressed in a frequency domain, the first speech transfer characteristic and the second speech transfer characteristic may be a first transfer function and a second transfer function in the frequency domain respectively, and the modifying process may modify the extracted feature parameter according to a formula: $F \cdot C1/C2$ where the F is the extracted feature parameter, the C1 is the first transfer function, and the C2 is the second transfer function.

In the apparatus according to this aspect, distortion caused by an influence of the real environment can be removed, and therefore, an accuracy of the speech recognition apparatus can be improved in various environments with simple and rapid processes.

According to further aspect of the present invention, in the above-stated apparatus, the feature parameter may be expressed in a cepstrum domain, the first speech transfer characteristic and the second speech transfer characteristic may be a first transfer function and a second transfer function in the cepstrum domain respectively, and the modifying process may modify the extracted feature parameter according to a formula: $F+C1-C2$, where the F is the extracted feature parameter, the C2 is the first transfer function, and the C2 is the second transfer function.

In this apparatus, accordingly to this aspect, distortion of an influence of the real environment can be removed, and therefore, an accuracy of the speech recognition apparatus can be further improved in various environments with simple and rapid processes.

DETAILED DESCRIPTION OF THE PREFERRED EMBODIMENTS

Figure 1:
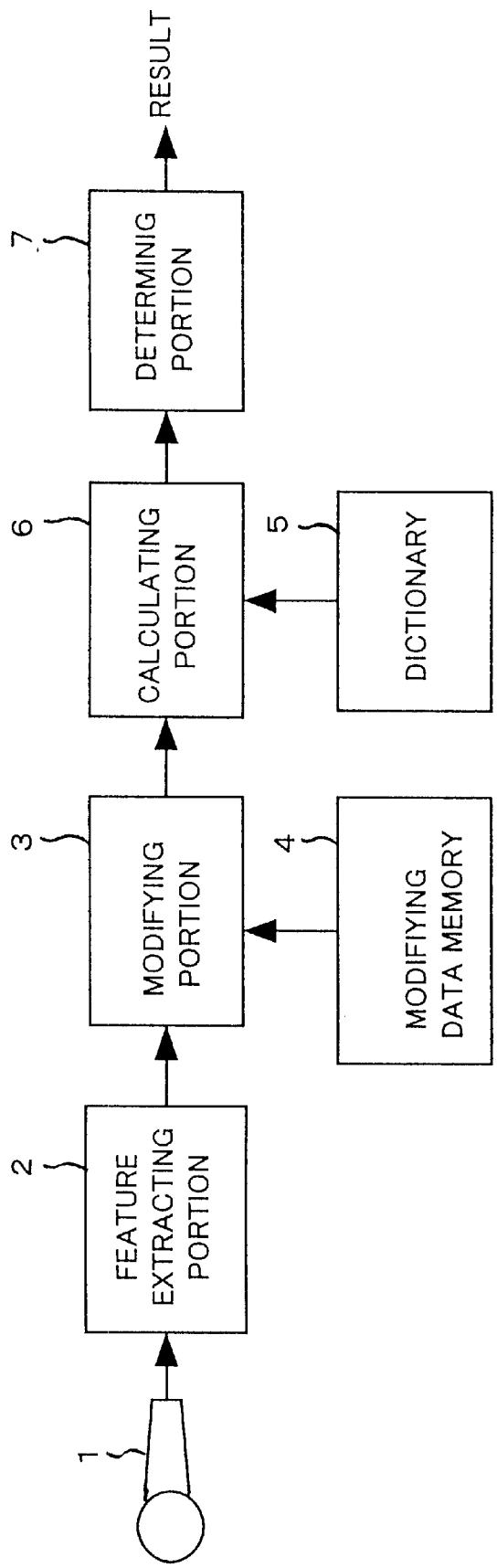
FIG.1 is a block diagram showing a speech recognition apparatus of an embodiment of the present invention.

Referring to the accompanying drawings, embodiments of the present invention will be described. In the description set forth hereinafter, the present invention is applied to a speech recognition apparatus.

FIG.1 shows a block diagram of a speech recognition apparatus 100 of an embodiment of the present invention. As shown in FIG.1, the speech recognition apparatus 100 is provided with a microphone 1, a feature extracting portion 2, a modifying portion 3, a modifying data memory 4, a dictionary 5, a calculating portion 6 and a determining portion 7.

The microphone 1 is an input device for an input speech produced by a speaker, and the microphone 1 outputs a speech signal.

The feature extracting portion 2 operates to extract feature parameters of the speech signal. More concretely, the feature extracting portion 2 converts the speech signal into a digital speech signal, divides the digital speech signal into frames each having predetermined frame length, and analyzes the digital speech signal to thereby extract the feature parameters.

The feature parameters extracted by the feature extracting portion 2 are necessary for distinguishing phonological units of a speech sounds which compose a speech. The extracted feature parameters can be utilized efficiently for the speech recognition, because the speech signal includes a lot of lengthy information.

Parameters in a frequency domain are generally used as the feature parameters. Namely, the nature of phonological units of speech sounds in a speech is expressed by a spectral envelope and its fluctuation in time, so the spectral envelope in the frequency domain can be utilized as the feature parameters of the speech recognition.

When the spectral envelope is analyzed, a speech, which actually is a nonstationary signal, is regarded as a stationary signal within a short interval. Therefore, time length of one analyzing frame should be set at a value of the order of 10 millisecond, and an order for analyzing should be set so small that a spectral fine structure dose not appear.

Then, the feature parameters, which are expressed in the frequency domain, can also be expressed in a cepstrum domain. Here the cepstrum, which can be obtained by inverse Fourier transform of the spectrum on the logarithm, has a characteristic which approximates an auditory characteristic of a human, and can express the spectral envelope and the spectral fine structure separately.

The feature parameters expressed in the frequency domain or the cepstrum domain is inputted to the modifying portion 3. The modifying portion 3 operates in the following manner, in order to remove an influence of distortion of a transmission path.

The speech recognition apparatus 100 is used in various conditions, such as, mounted in a car, or installed in a telephone apparatus. So speech recognition processes are carried out in different environments depending on an area or a shape of the inside space of a car or a room, and therefore its sound fields characteristics are changeable. On the other hand, if a speech signal is transmitted through a telephone line, then speech recognition processes are influenced by transfer characteristics of a telephone line, and influenced by the fluctuation of environmental noise levels.

In a real environment, an actual speech produced by a speaker is distorted by influences of such various conditions. Such a distorted speech can be expressed by a mathematical formula in the frequency domain as follows:

$$S(\omega) \cdot Cr(\omega) \qquad (1)$$

where the $S(\omega)$ denotes the ideal feature parameter of a speech, and the $Cr(\omega)$ denotes the transfer function representing the real environment.

Meanwhile, in the dictionary 5, reference patterns for the speech recognition (i.e., speech models) are pre-stored. These patterns are created by recording various speeches in the ideal environment such as an anechoic chamber. For example, the patterns are created as follows: a microphone is set in the anechoic chamber, and then, the distance between the microphone and the speaker is set, and then, the speeches produced by the speaker are actually recorded. The reference patterns are influenced by an transfer function $Ct(\omega)$ based upon some inherent factors of the anechoic chamber and other factors of the environment in which recording of the speeches is done.

In the modifying process for the speech recognition, a transfer function $Cr(\omega)$) which can reproduce the real environment in which the speech recognition apparatus is utilized is used. This transfer function $Cr(\omega)$ is stored in the modifying data memory 4. Further, in the modifying process, the transfer function $Ct(\omega)$, which represents the environment in which the reference patterns was recorded (i.e., anechoic chamber), is also used. This transfer function $Ct(\omega)$ is also stored in the modifying data memory 4. If there are various assumed environments, a plurality of predetermined transfer functions $Cr'(\omega)$ can be stored in the modifying data memory 4, and it is possible to select one of them to set up. In this case, any one of the transfer functions $Ct(\omega)$ may be selected in the modifying process.

As can be understood from the above, in most cases the transfer function in the real environment $Cr(\omega)$ differs from the transfer function in the ideal environment $Ct(\omega)$. As a result, it causes degradation of performance for the speech recognition. In order to prevent this degradation, before a speech recognition process, the modifying portion 3 of the embodiment performs a modification for the speech, which is spoken in a real environment, and generates the modified feature parameters.

In the modifying process, the modifying portion 3 modifies the feature parameter $S(\omega) Cr(\omega)$ obtained from the real environment by using the transfer functions $Cr(\omega)$ and $Ct(\omega)$ stored in the modifying data memory 4, in order to generate a modified feature parameter $St(\omega)$. The modifying portion 3 concretely generates the modified feature parameter $St(\omega)$ by using the feature parameter $S(\omega) \cdot Cr(\omega)$ output from the feature extracting portion 2, the transfer functions $Cr(\omega)$ and $Ct(\omega)$ according to the following equation (2).

$$St(\omega) = \{Cr(\omega) \cdot S(\omega)\} Ct(\omega) / Cr'(\omega) \qquad (2)$$

An influence of the real environment on the transfer characteristic are cancelled in the above equation(2), so feature parameters corresponding to the ideal environment, in which the dictionary 5 is made, is generated. In the equation(2), if the transfer function in the real environment $Cr(\omega)$ and predetermined transfer function $Cr'(\omega)$ are similar to each other, then the modified feature parameter $St(\omega)$ having an ideal characteristic are derived.

Although the feature parameter obtained from the real environment is modified in the frequency domain in the above-stated modifying process, it may be modified in the cepstrum domain as described below.

As described above, the expression in a cepstrum domain is obtained by inverse Fourier transform of the spectrum on the logarithm, so a multiplication and a division in the frequency domain are replaced with an addition and a subtraction in the cepstrum domain respectively. Therefore, the equation(2) is changed into a following manner.

$$Cep[St] = Cep[CrS] + Cep[Ct] - Cep[Cr']tm \qquad (3)$$

In the equation(3), "Cep" means an amount expressed in the cepstrum domain. Said amounts $St(\omega)$, $Cr(\omega) \cdot S(\omega)$, $Ct(\omega)$ and $Cr'(\omega)$, which are expressed in the frequency domain, correspond to amounts $Cep[St]$, $Cep[CrS]$, $Cep[Ct]$ and $Cep[Cr']$, which are expressed in the cepstrum domain, respectively.

The equation(3) shows that in case of modifying a large quantity of speech data, a computation time, in which the modification is performed for the feature parameters in a cepstrum domain, become shorter than that in the frequency domain, because of a replacement of a multiplication and a division with an addition and a subtraction.

Next, the modified feature parameters are inputted to the calculating portion 6, and an output probability is calculated. Namely, a distribution of the feature parameters can be expressed with a polymodal probability density function corresponding to the limited number of phonemes, so the output probability based on a certain center and a certain distribution can be calculated.

For example, the output probability is generally calculated using a hidden Markov model (Hereinafter, it is referred as an "HMM".). The HMM is a model which has a plurality of states and expresses phonemes and words with state transition probabilities and symbol output probabilities. And the HMMs of necessary phonemes and words are registered with the dictionary 5 as the reference patterns, and the output probability is calculated using the HMMs, which are outputted from the dictionary 5, for each modified feature parameter.

Next, the determining portion 7 determines the biggest probability based on calculated output probabilities, and sets it as a target to recognize. As a result of the determination by the determining portion 7, an input speech is recognized, and the result is outputted.

As shown in equations (2) and (3), the modifying process for feature parameters in the frequency domain and the cepstrum domain are described above. However, the present invention can be adapted to a speech recognition using the modifying process in which the feature parameters are expressed in a time domain. In this case, calculations corresponding to the equations (2) and (3) are performed by convolutions. So, an amount of the necessary calculations in the time domain increases more than that in the frequency domain or the cepstrum domain.

As described above in detail, according to the speech recognition apparatus of the embodiment, the modifying portion 3 calculates equations (2) and (3) using the data stored in the modifying data memory 4. As a result, the modified feature parameters, which is cancelled the influence of distortion in the real environment, are derived. And the calculating portion 6 calculates the output probabilities using the data registered in the dictionary 5, and the determining portion 7 recognizes the input speech.

Accordingly, the degradation of the accuracy of a speech recognition is prevented more sufficeintly than that without the modifying process, because modified feature parameters have characteristics corresponding to the ideal environment in which the dictionary is made. The calculation using feature parameters expressed in the frequency domain. This is because the former needs the simple calculation including one multiplication and one division only, while the later needs complicated calculating including convolution integrals. The calculation using feature parameters expressed in the cepstrum domain is further easier, than using feature parameters expressed in the frequency domain. This is because the calculation in the cepstrum domain needs one addition and one subtraction only. Furthermore, the degradation of the accuracy of the speech recognition is prevented not only in case of different speakers or different words but also in case of same speakers or same words. As a result of an experiment, the accuracy of the speech recognition of the present embodiment was improved about 3 percent in a silent environment.

A program which operates the speech recognition processes of the present embodiment can be recorded in a computer readable mediums such that ROM, CD-ROM or floppy disk. And the program is installed in the computer with these mediums, and executed the speech recognition processes of the present embodiment.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-099051 filed on Apr. 10, 1998 including the specification, claims, drawings and summary is incorporated herein by reference in its entirety

What is claimed is:

1. A method of modifying a feature parameter for a speech recognition comprising the processes of:

extracting the feature parameter from an input speech in a real environment;

reading a first speech transfer characteristic corresponding to an environment in which a reference pattern for the speech recognition is generated, from a first memory device;

reading a second speech transfer characteristic corresponding to the real environment from a second memory device; and modifying the extracted feature parameter according to the first speech transfer characteristic and the second speech transfer characteristic to convert the extracted feature parameter corresponding to the real environment into a modified feature parameter corresponding to the environment in which the reference pattern is generated.

2. The method according to claim 1, wherein the feature parameter is expressed in a frequency domain, the first speech transfer characteristic and the second speech transfer characteristic are a first transfer function and a second transfer function in the frequency domain respectively, and the modifying process modifies the extracted feature parameter according to a formula:

$$F \cdot C1/C2$$

where the F is the extracted feature parameter, the C1 is the first transfer function, and the C2 is the second transfer function.

3. The method according to claim 1, wherein the feature parameter is expressed in a cepstrum domain, the first speech transfer characteristic and the second speech transfer characteristic are a first transfer function and a second transfer function in the cepstrum domain respectively, and the modifying process modifies the extracted feature parameter according to a formula:

$$F+C1-C2,$$

where the F is the extracted feature parameter, the C1 is the first transfer function, and the C2 is the second transfer function.

4. A method of a speech recognition comprising the processes of:

extracting a feature parameter from an input speech in a real environment;

reading a first speech transfer characteristic corresponding to an environment in which a reference pattern for the speech recognition is generated, from a first memory device;

reading a second speech transfer characteristic corresponding to the real environment from a second memory device;

modifying the extracted feature parameter according to the first speech transfer characteristic and the second speech transfer characteristic to convert the extracted feature parameter corresponding to the real environment into a modified feature parameter corresponding to the environment in. which the reference pattern is generated;

calculating an output probability using the modified feature parameter and the reference pattern; and recognizing the input speech using the calculated output probability.

5. The method according to claim 4, wherein the feature parameter is expressed in a frequency domain, the first speech transfer characteristic and the second speech transfer characteristic are a first transfer function and a second transfer function in the frequency domain respectively, and the modifying process modifies the extracted feature parameter according to a formula:

$$F \cdot C1/C2$$

where the F is the extracted feature parameter, the C1 is the first transfer function, and the C2 is the second transfer function.

6. The method according to claim 4, wherein the feature parameter is expressed in a cepstrum domain, the first speech transfer characteristic and the second speech transfer characteristic are a first transfer function and a second transfer function in the cepstrum domain respectively, and the modifying process modifies the extracted feature parameter according to a formula:

$$F+C1-C2,$$

where the F is the extracted feature parameter, the C1 is the first transfer function, and the C2 is the second transfer function.

7. A speech recognition apparatus comprising:

an extracting device for extracting a feature parameter from an input speech in a real environment;

a first memory device for storing a first speech transfer characteristic corresponding to an environment in which a reference pattern for the speech recognition is generated;

a second memory device for storing a second speech transfer characteristic corresponding to the real environment;

a modifying device for modifying the extracted feature parameter according to the first speech transfer characteristic and the second speech transfer characteristic to convert the extracted feature parameter corresponding to the real environment into a modified feature parameter corresponding to the environment in which the reference pattern is generated;

a calculating device for calculating an output probability using the modified feature parameter and the reference pattern; and a recognizing device for recognizing the input speech using the calculated output probability.

8. The speech recognition apparatus according to claim 7, wherein the feature parameter is expressed in a frequency domain, the first speech transfer characteristic and the second speech transfer characteristic are a first transfer function and a second transfer function in the frequency domain respectively, and the modifying process modifies the extracted feature parameter according to a formula:

$$F \cdot C1/C2$$

where the F is the extracted feature parameter, the C1 is the first transfer function, and the C2 is the second transfer function.

9. The speech recognition apparatus according to claim 7, wherein the feature parameter is expressed in a cepstrum domain, the first speech transfer characteristic and the second speech transfer characteristic are a first transfer function and a second transfer function in the cepstrum domain respectively, and the modifying process modifies the extracted feature parameter according to a formula:

$$F+C1-C2,$$

where the F is the extracted feature parameter, the C1 is the first transfer function, and the C2 is the second transfer function.

10. A computer readable medium containing a program for performing a speech recognition comprising the processes of:

extracting a feature parameter from an input speech in a real environment;

reading a first speech transfer characteristic corresponding to an environment in which a reference pattern for the speech recognition is generated, from a first memory device;

reading a second speech transfer characteristic corresponding to the real environment from a second memory device;

modifying the extracted feature parameter according to the first speech transfer characteristic and the second speech transfer characteristic to convert the extracted feature parameter corresponding to the real environment into a modified feature parameter corresponding to the environment in which the reference pattern is generated;

calculating an output probability using the modified feature parameter and the reference pattern; and recognizing the input speech using the calculated output probability.

11. The computer readable medium according to claim 10, wherein the feature parameter is expressed in a frequency domain, the first speech transfer characteristic and the second speech transfer characteristic are a first transfer function and a second transfer function in the frequency domain respectively, and the modifying process modifies the extracted feature parameter according to a formula:

$$F \cdot C1/C2$$

where the F is the extracted feature parameter, the C1 is the first transfer function, and the C2 is the second transfer function.

12. The computer readable medium according to claim 10, wherein the feature parameter is expressed in a cepstrum domain, the first speech transfer characteristic and the second speech transfer characteristic are a first transfer function and a second transfer function in the cepstrum domain respectively, and the modifying process modifies the extracted feature parameter according to a formula:

$$F+C1-C2,$$

where the F is the extracted feature parameter, the C1 is the first transfer function, and the C2 is the second transfer function.

* * * * *